US010375342B2

(12) United States Patent
Alsina et al.

(10) Patent No.: US 10,375,342 B2
(45) Date of Patent: Aug. 6, 2019

(54) BROWSING REMOTE CONTENT USING A NATIVE USER INTERFACE

(71) Applicant: Apple Inc., Cupertino, CA (US)

(72) Inventors: Thomas Alsina, Mountain View, CA (US); Lucas C. Newman, San Francisco, CA (US); Nicholas James Paulson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1202 days.

(21) Appl. No.: 13/851,716

(22) Filed: Mar. 27, 2013

(65) Prior Publication Data

US 2014/0298414 A1 Oct. 2, 2014

(51) Int. Cl.
*G06F 3/0488* (2013.01)
*H04N 5/445* (2011.01)
*H04N 21/41* (2011.01)
*H04N 21/422* (2011.01)
*H04N 21/431* (2011.01)
*H04N 21/462* (2011.01)
*H04N 5/44* (2011.01)

(52) U.S. Cl.
CPC ....... *H04N 5/44582* (2013.01); *H04N 5/4403* (2013.01); *H04N 21/4126* (2013.01); *H04N 21/42209* (2013.01); *H04N 21/42224* (2013.01); *H04N 21/4314* (2013.01); *H04N 21/4621* (2013.01); *H04N 2005/443* (2013.01); *H04N 2005/4407* (2013.01); *H04N 2005/4408* (2013.01)

(58) Field of Classification Search
CPC .......... G06F 3/0488; H04N 2005/4407; H04N 2005/4408; H04N 2005/443
See application file for complete search history.

(56) References Cited

U.S. PATENT DOCUMENTS

| 8,160,564 | B1 * | 4/2012 | Gunasekara | G06F 3/04842 455/419 |
|---|---|---|---|---|
| 8,225,191 | B1 | 7/2012 | Kalman | |
| 2003/0043191 | A1 * | 3/2003 | Tinsley | G06F 9/4443 715/762 |
| 2003/0123850 | A1 * | 7/2003 | Jun | G06F 17/30796 386/343 |
| 2005/0060641 | A1 * | 3/2005 | Sezan | H04L 12/2805 715/202 |
| 2005/0138550 | A1 * | 6/2005 | Dermler | G06F 17/30905 715/247 |
| 2005/0210514 | A1 * | 9/2005 | Kittlaus | H04L 29/06027 725/81 |
| 2005/0286722 | A1 * | 12/2005 | Aboba | H04L 63/04 380/277 |

(Continued)

*Primary Examiner* — Stephen S Hong
*Assistant Examiner* — Marshon Robinson
(74) *Attorney, Agent, or Firm* — Blank Rome LLP

(57) ABSTRACT

The disclosed technology relates to receiving media signals from a media device and rendering a user interface that is native to the device receiving the media signals based on information encoded in the media signals. The device receiving the media signal interprets information received from the media device describing media content and semantic information describing a type of interface page, and displays the content based on the semantic information in a graphical user interface (GUI) on the electronic device based on the interpretation.

28 Claims, 13 Drawing Sheets

(56) References Cited

U.S. PATENT DOCUMENTS

| | | | |
|---|---|---|---|
| 2007/0168413 A1* | 7/2007 | Barletta | G06F 3/04883 709/203 |
| 2008/0001774 A1* | 1/2008 | Huang | G08C 17/00 340/13.24 |
| 2008/0282172 A1* | 11/2008 | Bayang | G06F 9/4443 715/744 |
| 2010/0317332 A1 | 12/2010 | Bathiche et al. | |
| 2011/0107243 A1* | 5/2011 | Jain | G06F 17/30997 715/762 |
| 2011/0202848 A1 | 8/2011 | Ismalon | |
| 2011/0225543 A1* | 9/2011 | Arnold | G06F 3/0488 715/799 |
| 2011/0276335 A1 | 11/2011 | Silvera et al. | |
| 2012/0005311 A1* | 1/2012 | Livingston | G06F 21/6218 709/219 |
| 2012/0081615 A1* | 4/2012 | Starr | H04N 21/4222 348/734 |
| 2012/0159358 A1* | 6/2012 | Waher | G06F 9/4443 715/762 |
| 2012/0162536 A1 | 6/2012 | Sibilsky et al. | |
| 2012/0210225 A1 | 8/2012 | McCoy et al. | |
| 2012/0232886 A1* | 9/2012 | Capuozzo | H04L 12/2814 704/9 |
| 2012/0282914 A1 | 11/2012 | Alexander | |
| 2012/0284631 A1* | 11/2012 | Lancioni | G06F 8/38 715/744 |
| 2012/0297423 A1 | 11/2012 | Kanojia et al. | |
| 2013/0007576 A1 | 1/2013 | Lund et al. | |
| 2013/0041938 A1* | 2/2013 | Lin | G06F 3/0488 709/203 |
| 2013/0073508 A1* | 3/2013 | Zhou | H04L 65/1083 706/47 |
| 2013/0262687 A1* | 10/2013 | Avery | G06F 9/54 709/229 |
| 2013/0290858 A1* | 10/2013 | Beveridge | G06F 3/0484 715/740 |
| 2014/0013234 A1* | 1/2014 | Beveridge | G06F 3/0484 715/740 |
| 2015/0081714 A1* | 3/2015 | Byron | G06F 3/0482 707/739 |
| 2015/0121193 A1* | 4/2015 | Beveridge | G06F 17/30893 715/234 |
| 2016/0048275 A1* | 2/2016 | Beavers | G06F 3/0483 715/202 |

\* cited by examiner

BROWSING REMOTE CONTENT USING A NATIVE USER INTERFACE

BACKGROUND

1. Technical Field

The present disclosure relates to the displaying content and more specifically to remote browsing of content.

2. Introduction

Many media devices utilize remote controls for browsing through and selecting content. However, known remote controls are too simplistic and are not user friendly. For example, common television remote controls are configured with up/down/left/right buttons, a selection indicator button, and maybe a keypad with numbers zero through nine. This exemplary remote control was well suited for browsing old-fashion numerical list television programming structures. However, a new paradigm exists for the way media consumers explore media options. For example, a newly popular way to search for content is through text entry, which can be very time-consuming when using a simplistic remote control.

Mirroring a display of a media device onto another display of another electronic device can result in the poor representation of the content. For example, suppose a large screen television display can clearly display one hundred icons that are clear enough to decipher. The same one hundred icons mirrored onto the small screen of smartphone would clearly be indecipherable. Alternatively, the smartphone could only view a small portion of the mirrored display at a time, but doing so is not user friendly. Mirroring technology does not adequately address the need for remote browsing of content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for discovering media signals and rendering a native user interface based on information encoded in the media signals.

Some embodiments of the present technology involve a media device transmitting information describing media content to a client device along with semantic information describing how to display the information. The media device encodes the semantic information within a signal that is used to transmit the content information and the client device uses programming logic to decode the semantic information and to render a native user interface for displaying the content. In some embodiments, the client device accesses the programming logic from local memory. In some embodiments, the client device accesses the programming logic from an external source such as a cloud-based storage platform, an external website, etc.

After a client device renders the native user interface based on semantic information received from the media device, the client device accepts inputs from a user that are used for controlling the media device. In some embodiments, a user of the client device actively controls the media device when the client device sends each user input back to the media device in the form of a control instruction. In some other embodiments, a user passively browses the rendered user interface and pushes control instructions to the media device using an interface element to specify when to push a command.

In some embodiments of the present technology, the media device encodes menu hierarchy information within the media signal describing media content. The menu hierarchy information describes how a menu presently being displayed on the device can be rendered on the client device and also describes how the menu fits into a hierarchy of menus. In these embodiments, the client device can render another menu in the hierarchy without the media device sending another signal.

The client device can also discover additional information about content from an external source and send that additional information back to a media device. The media device can then incorporate the additional information in a display, broadcast, narrowcast, etc.

In some embodiment the present technology includes an electronic device discovering signals transmitted by a media device that have been encoded with information describing media content available from the media device as well as semantic information describing a type of interface page that the content should be displayed or presented within. The electronic device decodes the semantic information, interprets how to display the content based on the type of page that is conveyed in the semantic information, and renders a graphical user interface on the electronic device based on that interpretation.

In some embodiments of the present technology a media devices authenticates a client device upon an electronic device providing a network key to a media device, or upon bringing an electronic device into a physical space near enough to a media device to be detected by a proximity sensor in the media device, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for allowing a media consumer to browse and control content on a display via the consumer's personal media device. Indeed, the present technology involves systems, methods, and computer-readable media for controlling a media device using another electronic device.

Figure 1:
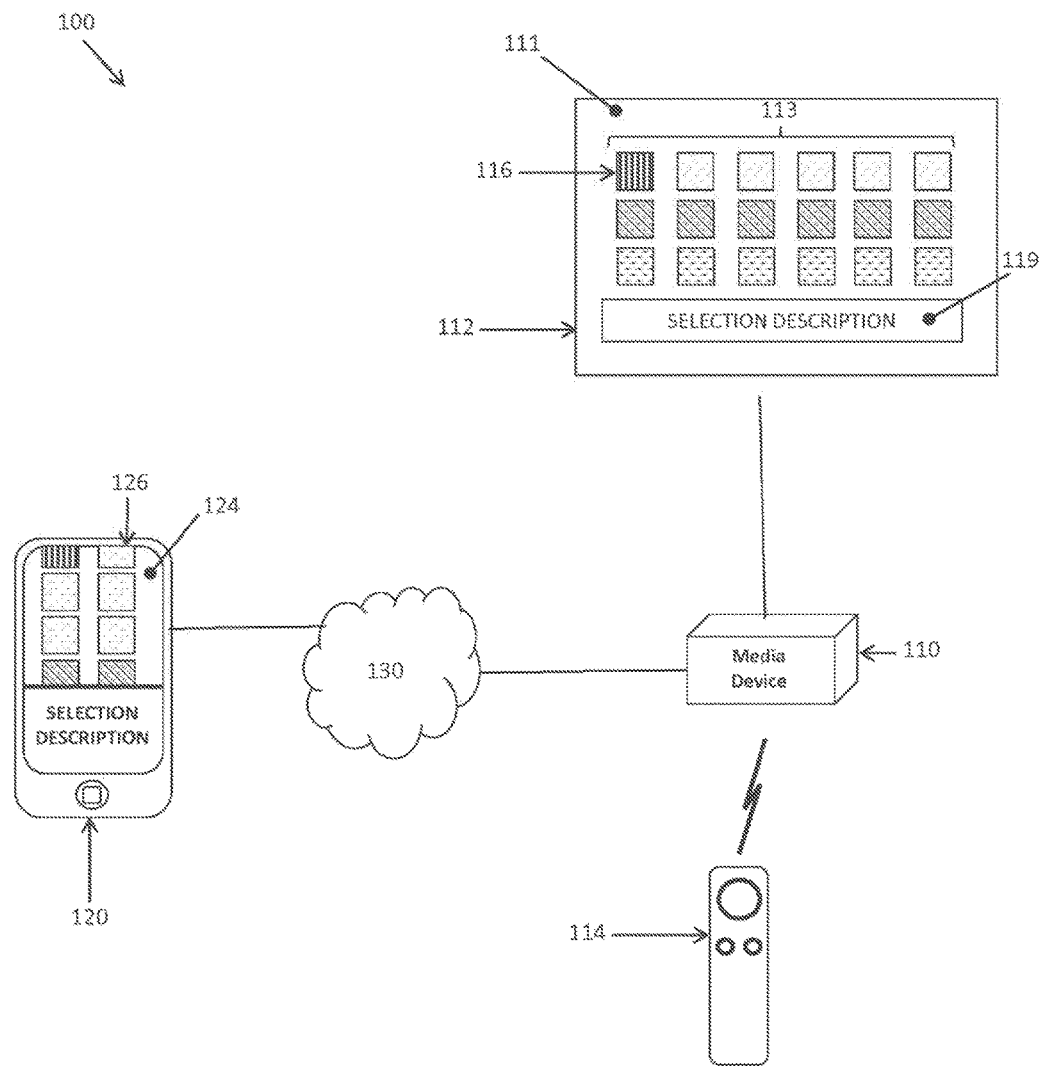
FIG. 1 illustrates an exemplary system for controlling a media device using a portable electronic device according to some embodiments of the present technology.

FIG. 1 illustrates a system 100 for controlling a media device 110 using a portable electronic device 120 according to some embodiments of the present technology. As illustrated in FIG. 1, a media device 110 is configured for publishing media content in a Graphical User Interface (hereinafter referred to as "GUI") 111 on a display 112. The media device 110 can be controlled using a remote control 114; however, as explained above, known remote controls are either too simplistic (e.g. up/down/left/right) and not well suited for certain actions (e.g. text entry) or are not user friendly. Accordingly, the present technology involves allowing the media device 110 to be controlled using the portable electronic device 120.

In some embodiments of the present technology, a media device 110 can comprise an electronic device that can cause various types of media content to be output to display devices, such as APPLE TV, available from Apple Inc. of Cupertino, Calif. The media device 110 can also comprise a computer running an application for playing content from a user library of content and for accessing media distribution platform such as the ITUNES, available from Apple Inc. of Cupertino, Calif. Also, the media device 110 can comprise a portable electronic device such as a smartphone or a tablet computer.

In some embodiments, the portable electronic device 120 includes a text entry feature such as a keyboard or a touchscreen display and a virtual keyboard. In some embodiments, the portable electronic device 120 comprises a smartphone, such as an IPHONE, available from Apple Inc. of Cupertino, Calif. In some embodiments, the portable electronic device comprises a tablet, such as an IPAD, available from Apple Inc. of Cupertino, Calif.

In some embodiments of the present technology, a GUI 111 is a media content navigation interface for browsing and selecting media content available from the media device 110. As illustrated, the GUI 111 is displaying a matrix 113 of icons that can describe media content. Additionally, an icon 116 can be selected to be the icon of current focus by the remote control 114 or the portable electronic device 120. Accordingly, the GUI displays a description of the selection in a description area 119.

The media device 110 is also configured to transmit media content description data along with semantic information describing a context for the media content information. For example, to allow control by the portable electronic device 120, the media device 110 can wirelessly transmit the media content description data and semantic information to the portable electronic device 120.

In some embodiments, the portable electronic device 120 is configured to receive the media content description data along with the semantic information, decode the semantic information, determine how to render a GUI according to the semantic information, and rendering a GUI 124 on a device screen 126 along with the content description data.

Unlike display mirroring techniques, the portable electronic device 120 renders a native GUI specifically tailored to the device's form factor according to imposition and layout rules stored on the portable electronic device 120 or remotely (as explained below). For example, the media device 110 can be configured to render the GUI 111 for the display 112 based on a form factor common to many television displays (e.g. 4:3 aspect ratio, 16:9 aspect ratio, etc.). However, many portable electronic devices involve a different form factor and can include different layouts or designs selected to increase user experience or increase cosmetic appeal. Thus, mirroring the form factor for the display 112 on the portable electronic device 120 can result in a poor quality GUI.

Accordingly, some embodiments of the present technology involve preprogramming the portable electronic device 120 with instructions for interpreting the semantic information and rendering a GUI 124 based on its own form factor. For example, given that the portable electronic device 120 has a much more narrow screen size than the display 112 and that the icons should not be too small to decipher, the GUI 124 orders the icons differently than the GUI 111.

In some embodiments, instructions for how to interpret semantic information are not stored on a portable electronic device, are outdated, or are otherwise deficient. In these cases, the portable electronic device 120 can download instructions for interpreting semantic information, as explained in greater detail below.

As shown in FIG. 1, the media device 110 and the portable electronic device 120 communicate via a network 130, such as a WIFI or Bluetooth network. Although specific network protocol are mentioned explicitly, those having ordinary skill in the art will appreciate that a wide variety of communication protocols, now known or later developed, can be used to carry out the present technology.

In some embodiments, a media consumer can simultaneously browse the GUI 124 rendered on the portable electronic device while controlling the media device 110 itself. For example, in some embodiments, all of the interactions that a media consumer has with the rendered GUI 124 are encoded into control signals and transmitted to the media device 110 for actively controlling the media device 110. Some other embodiments, of the present technology involve passively browsing the rendered GUI 124 and providing the media consumer with a button (not shown) used to indicate that the consumer would like to push a control signal to the media device. These various methods of actively and passively controlling a media device with a portable electronic device are discussed in more detail below.

As explained above, the media device 110 is configured for transmitting media content description data along with semantic information describing the media content information. In some embodiments, the semantic information can include a type of page being displayed on the display 112. For example, if the media device 110 is being used to browse movie content, the semantic information could specify page types including "content list", "search results", "movie details", etc. In these cases the content description data can include the actual data that is displayed in the page. Using the example of a "movie details" page type, the actual data can include a list of actors, a movie summary, a duration, movie rating, movie poster images, screenshots, etc.

In some embodiments, the media device 110 only sends content information and semantic information for a currently viewed page. That is, each time a page is navigated to on the display 112, the media device 110 transmits a new encoded signal for the electronic device 120 to decode. The portable electronic device 110 can also save or preserve, in a stack, one or more pages that have been navigated away from so that if the user subsequently chooses to back up levels in a UI, the portable electronic device 110 does not need to re-load those stacked pages. In some other embodiments, the media device 110 sends content information for a collection of related pages, semantic information for each of the pages in the collection, and data relating to individual page's positions as a navigational tree for ahead of time caching of data for pages that are accessible from the current page. For example, a "search results" page can always come after a "enter search term" page. In these embodiments, to promote efficiency and response time, the electronic device 120 can begin to interpret related pages prior to the pages actually being ready to be rendered. For example in search results, the device could start caching data so that it can instantly render a movie detail page when the user picks a movie.

In some embodiments, the semantic information describing the collection of related pages allows the GUI on the electronic device to interpret an input without waiting for the device to interpret a control signal and send back a new signal describing the newly displayed content. These embodiments can be useful when operating an electronic device in passive mode, as explained below.

Figure 2:
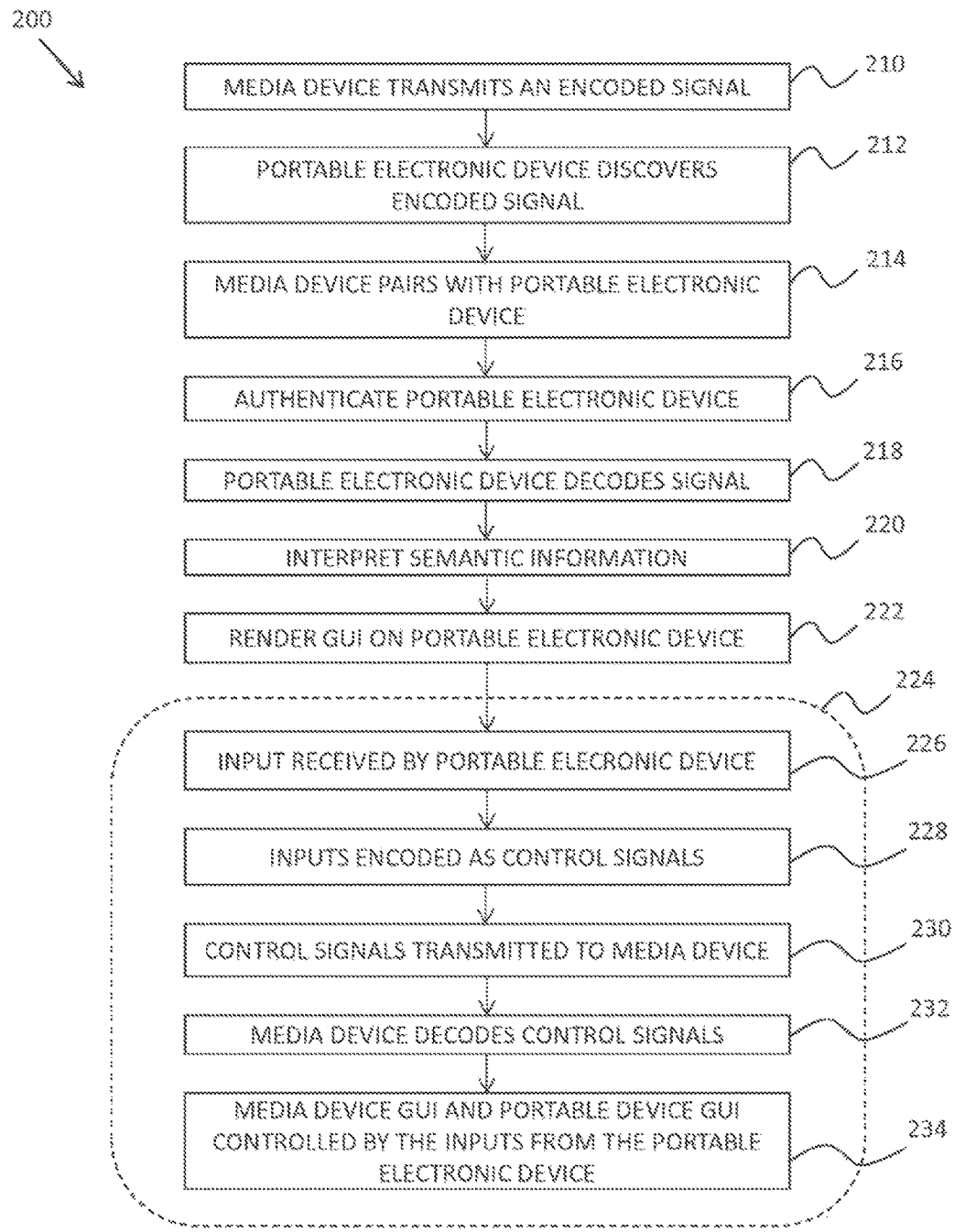
FIG. 2 illustrates an exemplary method of controlling a media device using an electronic device according to some embodiments of the present technology.

FIG. 2 illustrates a method 200 of controlling a media device using an electronic device according to some embodiments of the present technology. First, the method 200 involves a media device transmitting an encoded signal 210, the signal being encoded with information describing media content being displayed in a GUI on a display and encoded with semantic information describing the context of the media content as it relates to the GUI.

Next, the method 200 involves an electronic device discovering the signal 212 and pairing with the media device 214. In some embodiments, the devices can paired via a radio signal such as Bluetooth® or via a service discovery protocol such as Bonjour, developed by Apple Inc., Cupertino Calif., Universal Plug and Play (UPnP), zero configuration networking, etc.

Additionally, in some embodiments of the present technology, pairing with a media device 214 can require one or more additional steps of authenticating 216 an electronic device. For example, the media device can require that an electronic device initially authenticate itself with the device and can treat subsequent discovery attempts by the electronic device as being authenticated. On the other hand, some embodiments involve the media device asking the portable electronic device to authenticate itself before each session. Also, various types of authentication can be used to provide security to the system. For example, proximity sensors can be used by the media device to determine that an electronic device is near enough to the media device and, if so, allow the electronic device to the control media device. In some implementations, the proximity between the media device and the electronic device can be determined based on Bluetooth signal strength between the devices. In some embodiments, the media device infers that an electronic device with approved WIFI network credentials can be trusted to receive media signals and provide control signals.

Once the electronic device is paired with the media device, the method 200 continues with the electronic device decoding the signal 218, interpreting the semantic information using pre-programmed logic with pre-programmed, form-factor specific logic 220, and rendering a GUI on the electronic device 222 that displays the content description according to the interpreted semantic information.

According to the method 200 illustrated in FIG. 2, once a media device and a electronic device are paired and the electronic device renders a GUI, the electronic device begins to actively control the media device 224. When actively controlling the media device 224, all of the inputs received by the electronic device 226 are encoded as control signals 228, transmitted to the media device 230, decoded by the media device 232, and used to perform an action that affects the GUI on the media device or content being played by the media device 234. For example, in the case of browsing television programming, all of the inputs entered by the user into a handheld electronic device are translated into control instructions sent to the media device and are used to actively control the content displayed in the television GUI and/or television content displayed by the television.

This type of active mode is very useful in many circumstances; however, other times a user might prefer to passively interact with the content information on a personal GUI and only send control signals with a deliberate push instruction. For example, suppose a group of friends are sitting together and collectively deciding what to watch on a television. Some embodiments of present technology involve the media device sending programming content and GUI semantic information to each of the friends' devices, allowing the friends to individually, passively browse the programming options, and allowing an individual friend the opportunity to deliberately push a control signal to the media device when they find something that they think the group might enjoy.

Figure 3:
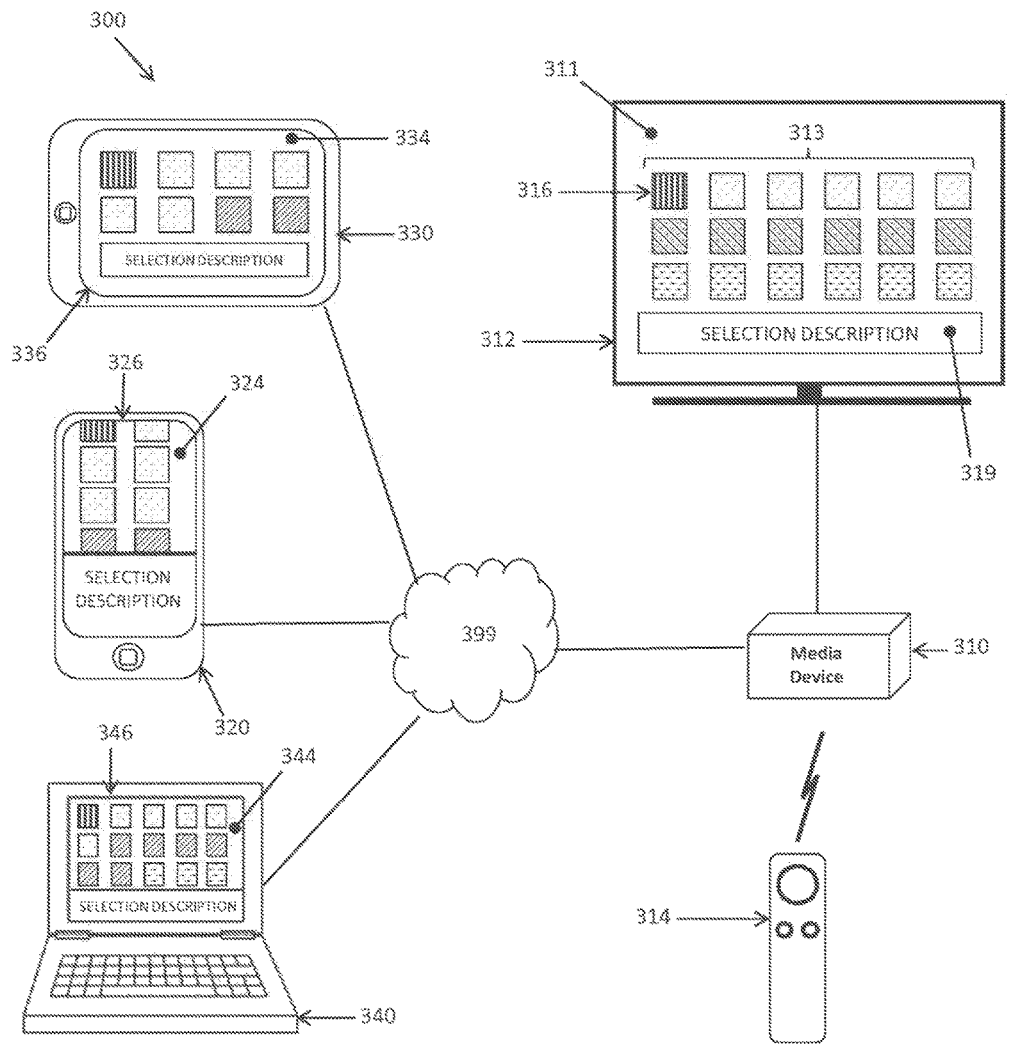
FIG. 3 illustrates an exemplary system that includes a plurality of devices, each configured with the ability to receive media content information from a media device, render a native GUI for viewing the content, and send control signals to the media device.

FIG. 3 illustrates an exemplary system 300 for providing a plurality of devices 320, 330, 340 the ability to receive media content information from a media device 310, render a native GUI for viewing the content, and send control signals to the media device.

As illustrated in FIG. 3, a media device 310 is configured for publishing media content on a display 312. The media device 310 can be controlled using a remote control 314 or one or more of the electronic devices 320, 330, 340. The media device 310 causes the display 312 to show a GUI 311 for browsing and selecting media content available from the media device 310. As illustrated, the GUI 311 displays a matrix 313 of icons that can describe media content. Additionally, an icon 316 can be selected to be the icon of current focus by the remote control 317 or by one or more of the portable electronic device 320, 330, 340.

The media device 310 is also configured for transmitting, over a network 399 media content description data along with semantic information describing the media content information for providing control to other devices. Likewise, the portable electronic devices 320, 330, 340 are configured for receiving the media content description data along with the semantic information, decoding the semantic information, determining how to render a GUI according to the semantic information, and rendering a GUI 324, 334, 344, respectively, on the device's screen 326, 336, 346, respectively, along with content description data.

As explained above, in some embodiments of the present technology, an electronic device can be configured in an "active mode" and can actively convert all user inputs into control signals for controlling the media device. In some other embodiments, the electronic device can be configured in a "passive mode" which allows the user to navigate the media content on one's own device without automatically sending control signals to the media device. In these embodiments, the rendered GUI can include one or more tools for pushing control signal to the media device when the user chooses to actively control the media device.

Figure 4:
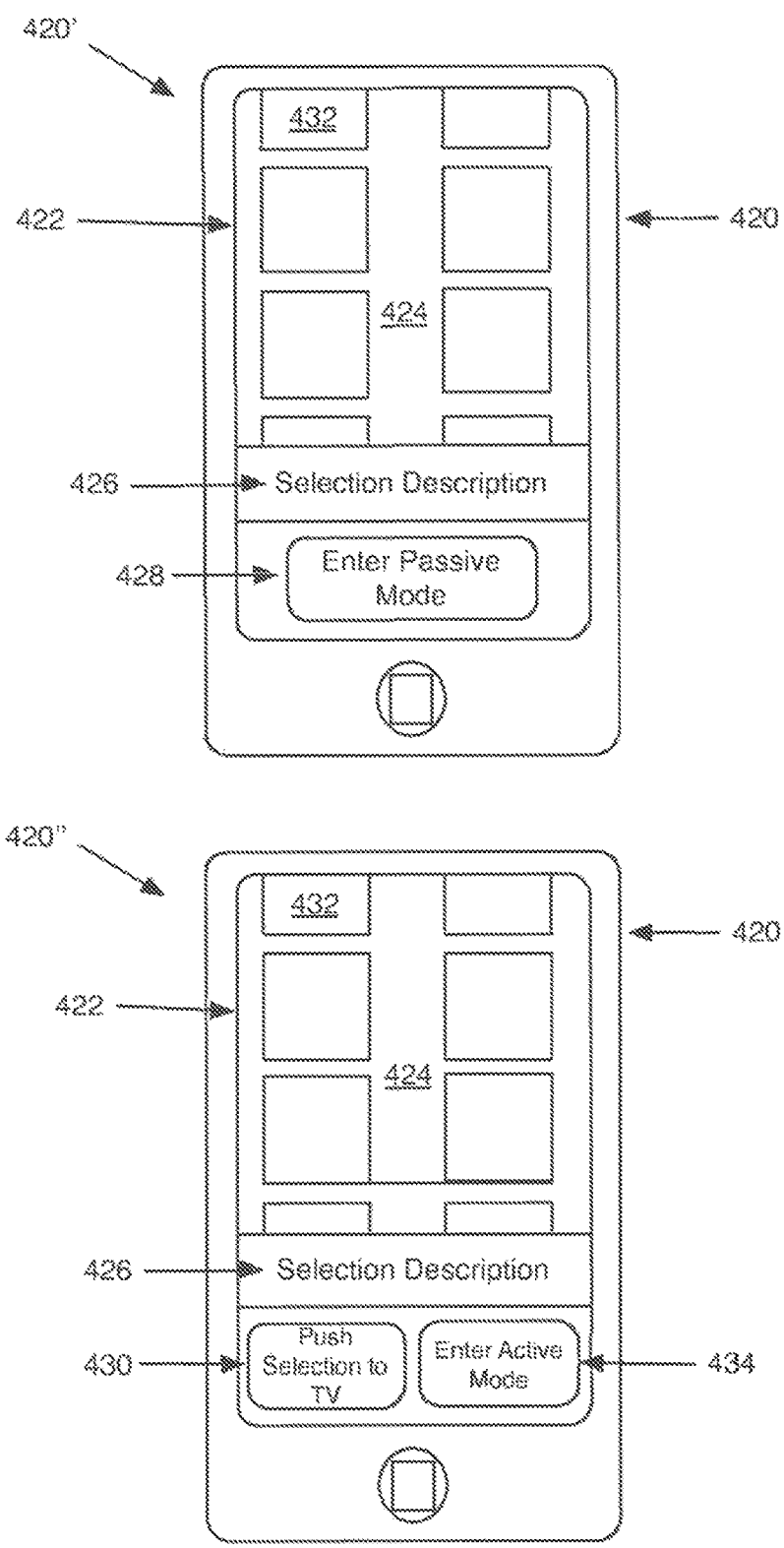
FIG. 4 illustrates a portable electronic device in an active mode and in a passive mode according to some embodiments of the present technology.

FIG. 4 illustrates a portable electronic device 420 in an active mode 420' and in a passive mode 420" according to some embodiments of the present technology. The electronic device 420 comprises a display 422 displaying a GUI 424 and a field 426 for describing some or all of the content received by the electronic device 420 from a media device.

In active mode 420', the GUI 424 accepts inputs from a user, controls the locally rendered GUI 424 on the device 420, and sends control signals to the media device in response to each input. Additionally, in active mode 420', the GUI 424 displays a button 428 for ending active mode 420' and beginning to operate in passive mode 420". In passive mode 420", the GUI 424 accepts inputs from a user, controls the locally rendered GUI 424 on the device 420, but does not actively send control signals to the media device in response to each input. Instead, the GUI 424 displays a button 430 for pushing a control signal to the media device. As shown, the button 430 is configured to instruct the media device to play media content associated with an icon having present focus 432. Additionally, the GUI 424 displays a button 434 for ending passive mode 420" and beginning to operate in active mode 420'.

Figure 5:
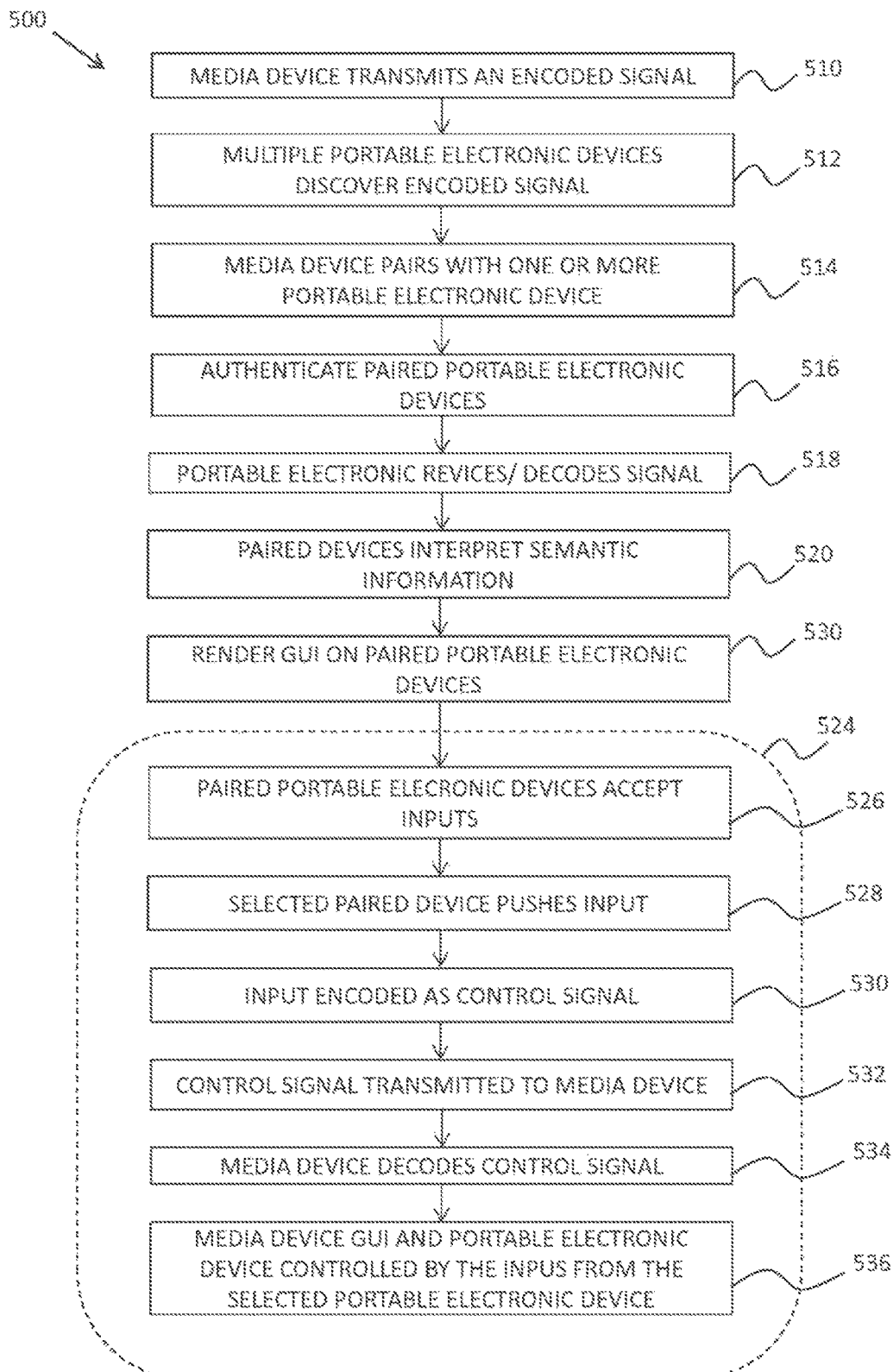
FIG. 5 illustrates a method of controlling a media device using a portable electronic device according to some embodiments of the present technology.

FIG. 5 illustrates a method 500 of controlling a media device using a portable electronic device according to some embodiments of the present technology. First, the method 500 involves a media device transmitting an encoded signal 510, the signal being encoded with information describing media content being displayed in a GUI on a display and encoded with semantic information describing the context of the media content as it relates to the GUI.

Next, the method 500 involves a portable electronic device discovering the signal 512 and pairing with the media device 514. Additionally, in some embodiments of the present technology, pairing with a media device 514 can require one or more additional steps of authenticating 516 a portable media device.

Once the portable electronic device is paired with the media device, the method 500 continues with the portable electronic device decoding the signal 518, interpreting the semantic information using pre-programmed logic with pre-programmed, form-factor specific logic 520, and rendering a GUI on the portable electronic device 522 that displays the content description according to the interpreted semantic information.

According to the method 500 illustrated in FIG. 5, once a media device and a portable electronic device are paired and the portable electronic device renders a GUI, the portable electronic device browses content on the portable device in passive mode 524. When in passive mode 524, inputs are received by the portable electronic device 526 but not necessarily pushed to the media device. However, upon a user of the paired device pushing an input 528, the input is encoded as control signals 530, transmitted to the media device 532, decoded by the media device 534, and used to perform an action that affects the GUI on the media device or content being played by the media device 536.

In many of the above examples, a GUI is rendered on the electronic devices according to logic stored locally on the device to recognize semantic information and. However, in some cases, a electronic device will not be able to recognize the semantic information. In some embodiments, when a device fails to recognize semantic information for informing the device how to render a native GUI, the device applies rules for displaying a default GUI that can still be used to navigate content, e.g. a rendition of a standard remote control.

Alternatively, some embodiments of the present technology involve the electronic device searching for logic to interpret unrecognized semantic information from one or more external locations.

Figure 6:
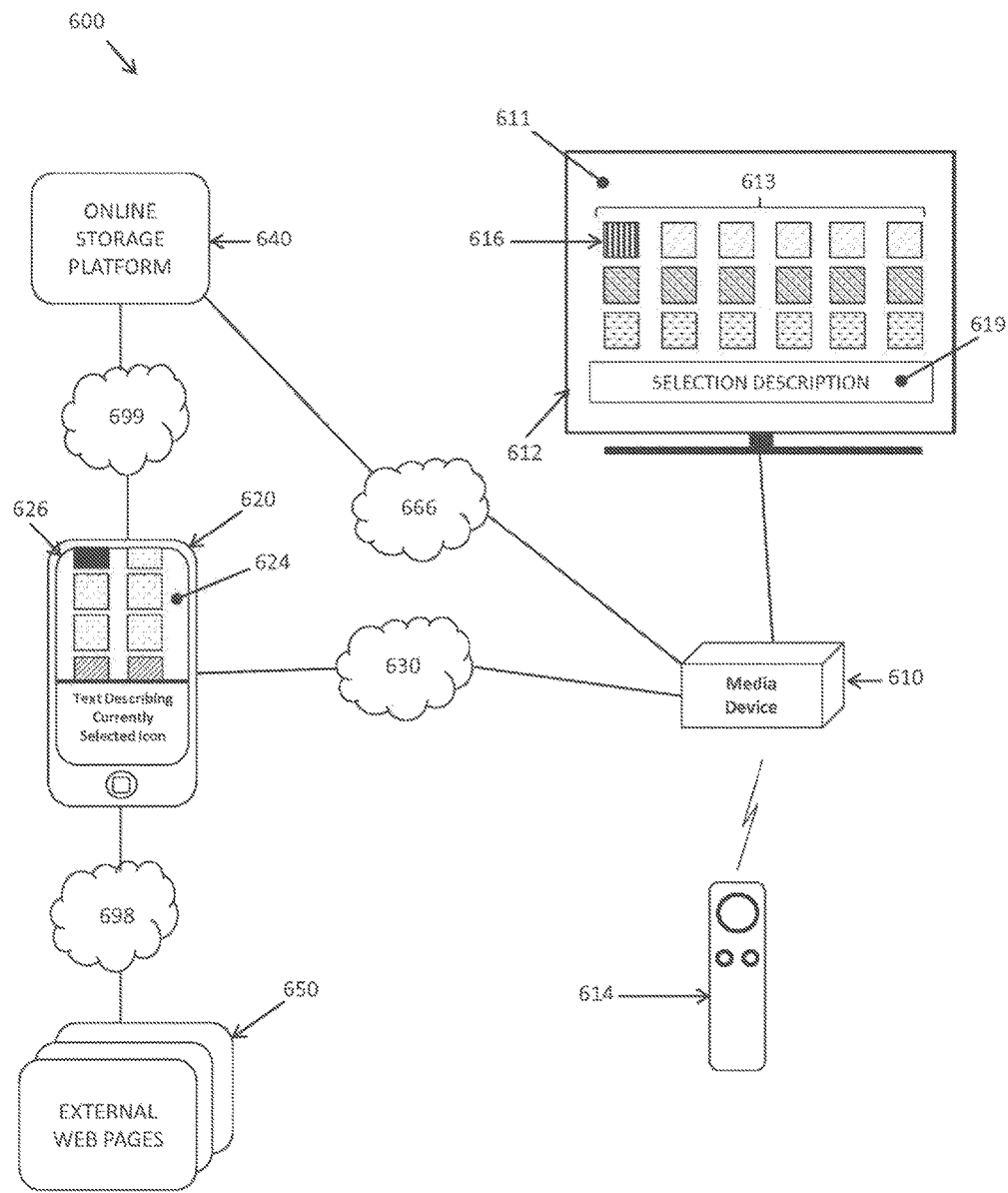
FIG. 6 illustrates an exemplary system for downloading logic from one or more external source that can be used to interpret unrecognized semantic information according to some embodiments of the present technology.
Figure 7A:
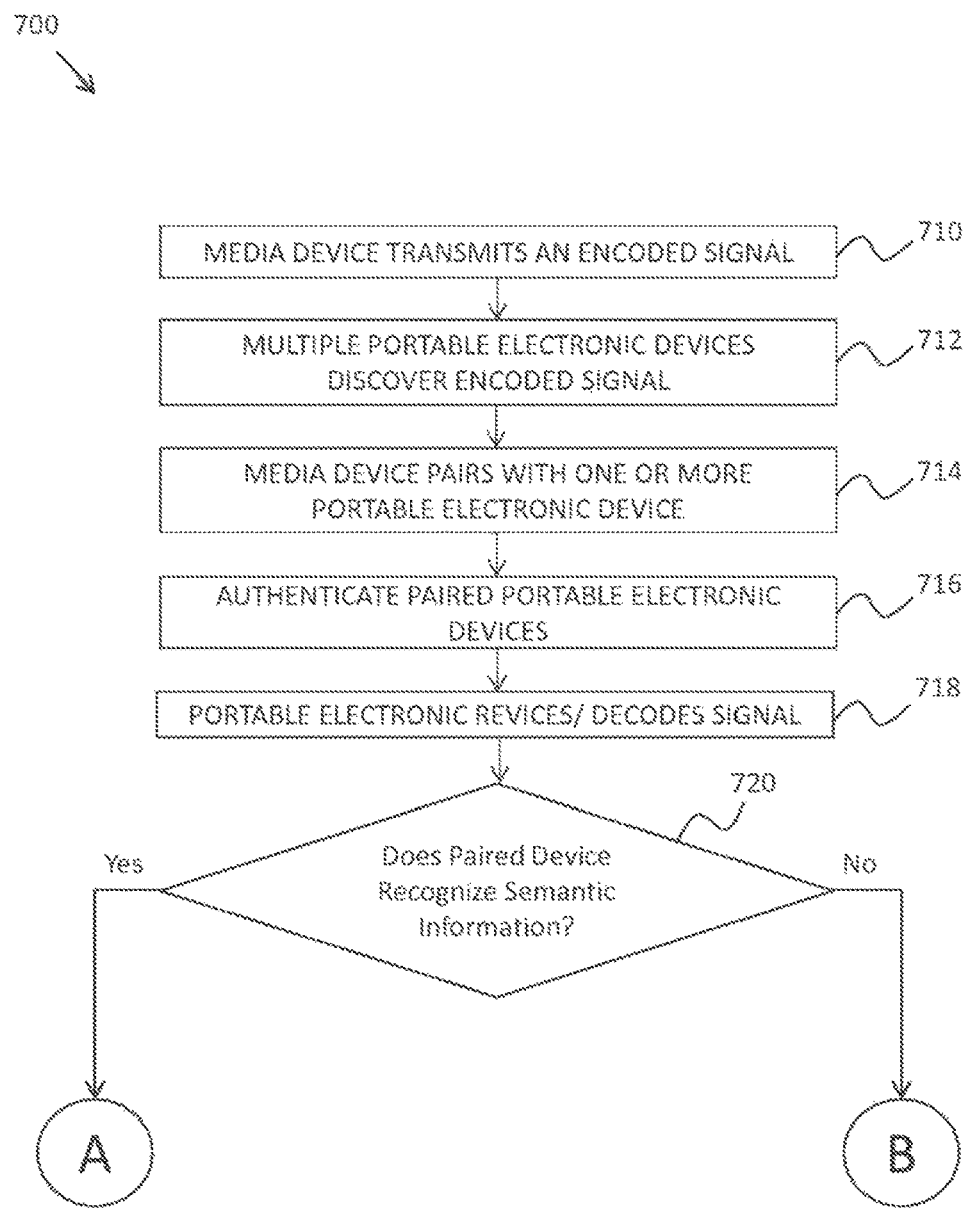
FIGS. 7A, 7B, 7C, and 7D illustrate a method of controlling a media device using a portable electronic device according to some embodiments of the present technology.
Figure 7B:
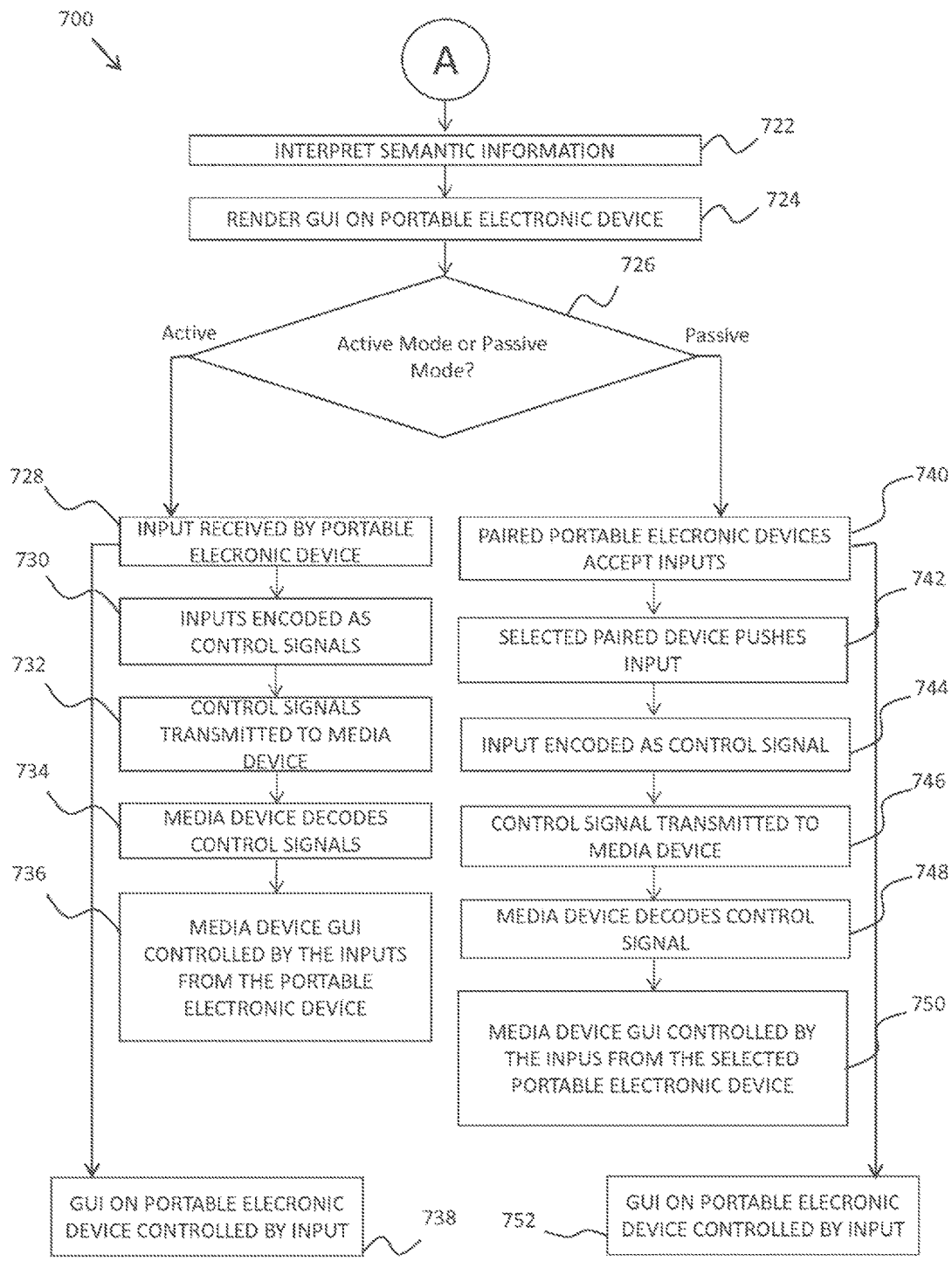
Figure 7C:
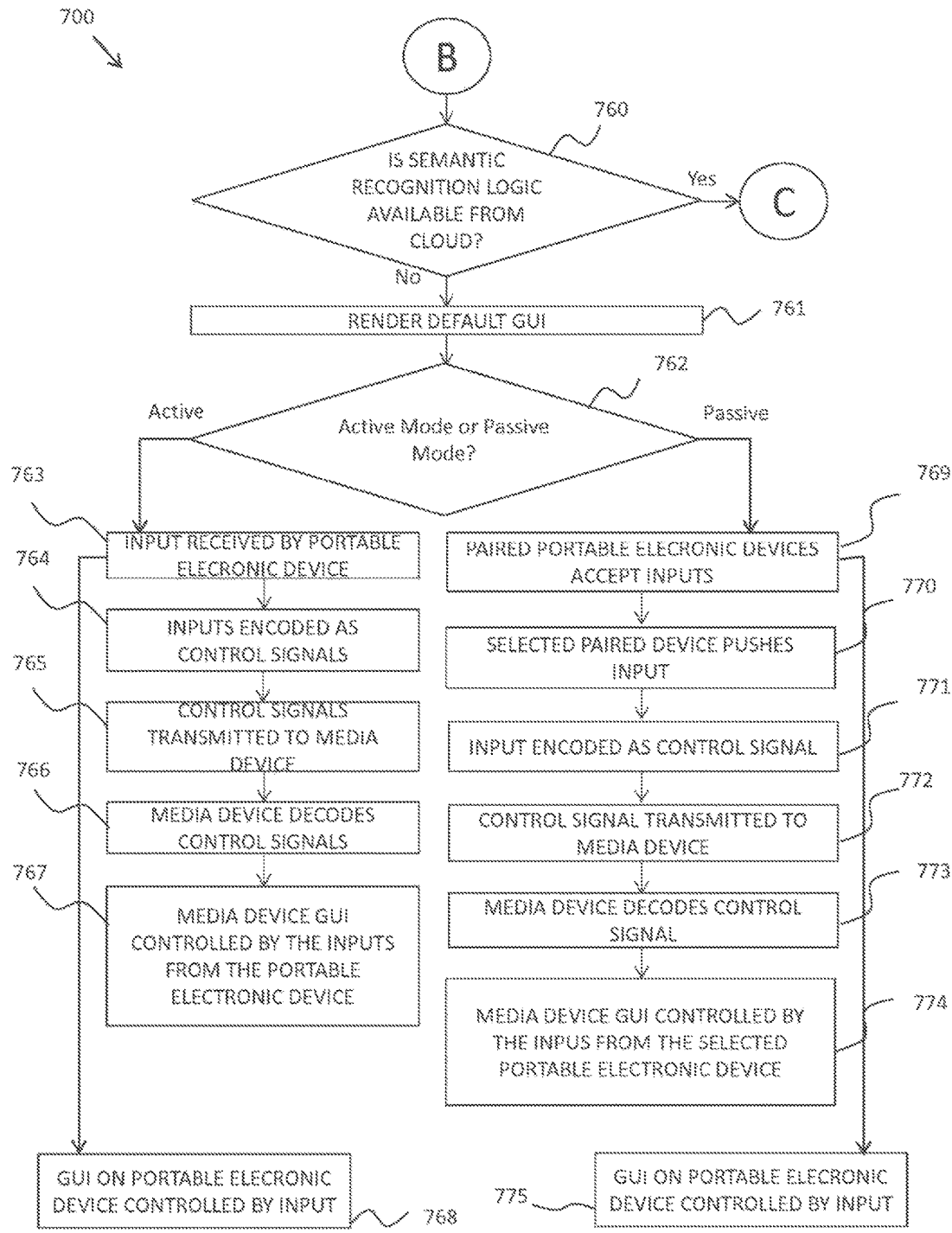
Figure 7D:
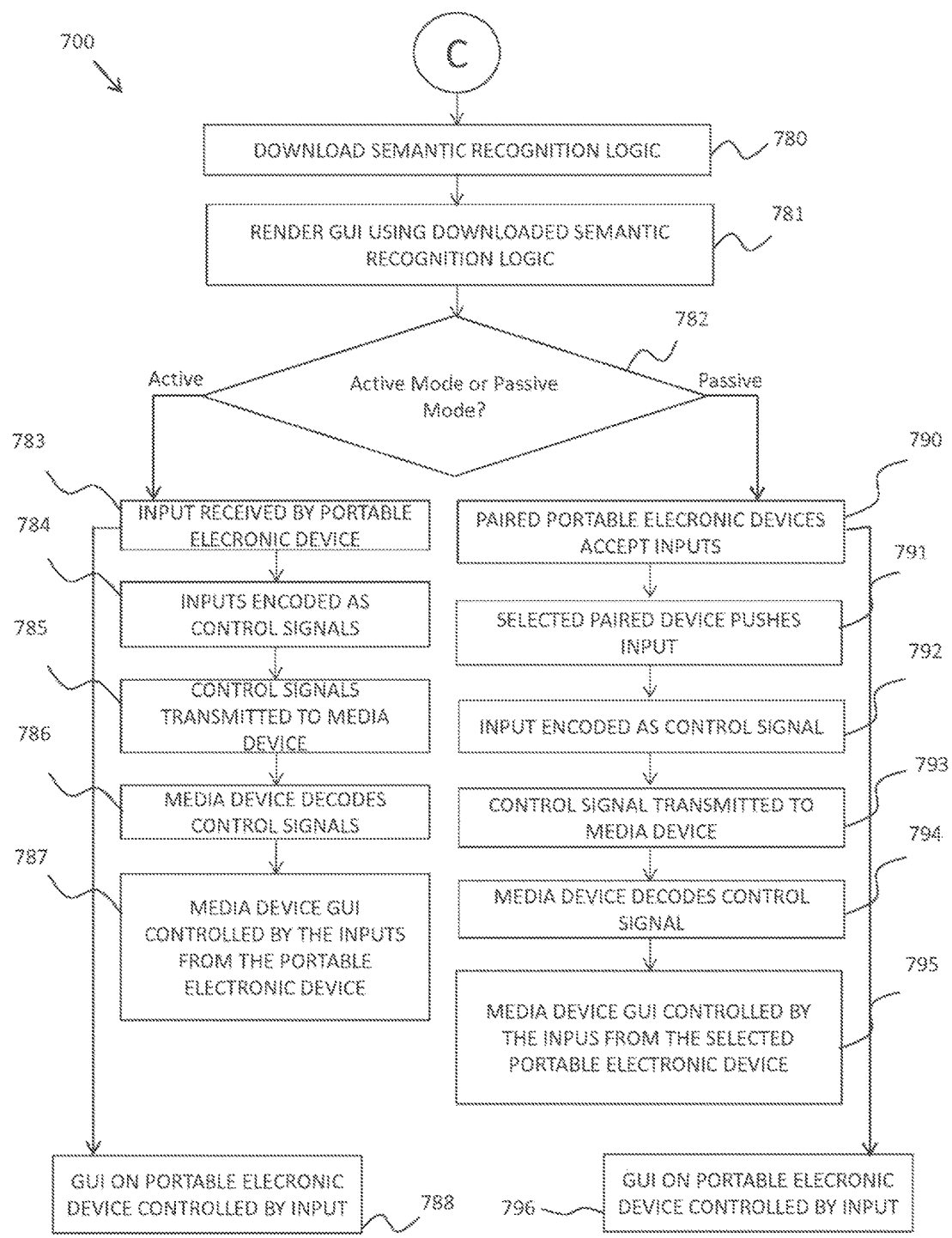

FIG. 6 illustrates an exemplary system 600 for downloading logic from one or more external source that can be used to interpret unrecognized semantic information according to some embodiments of the present technology.

According to FIG. 6, a media device 610 is configured for publishing media content on a display 612. The media device 610 can be controlled using a remote control 614 and by an electronic device 620. The media device 610 causes the display 612 to show a GUI 611 for browsing and selecting media content available from the media device 610. As illustrated, the GUI 611 displays a matrix 613 of icons that can describe media content. Additionally, an icon 616 can be selected to be the icon of current focus by the remote control 617 or the portable electronic device 620.

The media device 610 is also configured for transmitting, over a network 699 media content description data along with semantic information describing the media content information for providing control to other devices. Likewise, the portable electronic device 620 is configured for receiving the media content description data along with the semantic information, decoding the semantic information, determining how to render a GUI according to the semantic information, and rendering a GUI 624, on the device's screen 626 along with content description data. As shown in FIG. 6, the media device 610 and the portable electronic device 620 communicate via a network 630.

However, as explained above, sometimes the electronic device 620 does not recognize the semantic information. For example, the media device 610 and the electronic device 620 might have the same software required for transmitting and interpreting semantic information, but not have the same software version. Similarly, the media device 610 can be configured with a specific software application that involves a unique GUI while the electronic device does not have that application downloaded.

As shown in FIG. 6, the electronic device 620 is operatively coupled with an online storage platform 640 (e.g. ICLOUD, available from Apple, Inc, Cupertino, Calif.) via network 699 and with a plurality of external web pages 650 via network 698. Any of these network-accessed sources can store logic for download that can be used to interpret semantic information. Additionally, the networks 630, 666, 698, 699 can be the same network or different networks.

In some embodiments, the electronic device 620 can obtain information not available to the media device 610 and send the information back to the media device 610 to supplement its content. For example, suppose the media device 610 is displaying information relating to a collection of movies. The media device 610 displays the title, the actors' names, a plot summary, etc. However, while navigating a rendered GUI on a electronic device 620, the user visits an external web page that discusses trivia for the movie. Some embodiments involve the electronic device 620 sending the trivia information back to the media device 610 to be displayed on the display 612.

FIGS. 7A, 7B, 7C, and 7D illustrate a method 700 of controlling a media device using a portable electronic device according to some embodiments of the present technology. First, the method 700 involves a media device transmitting an encoded signal 710, the signal being encoded with information describing media content being displayed in a GUI on a display and encoded with semantic information describing the context of the media content as it relates to the GUI.

Next, the method 700 involves a portable electronic device discovering the signal 712 and pairing with the media device 714 and authenticating 716 a portable media device. Once the portable electronic device is paired with the media device and authenticated, the method 700 continues with the portable electronic device decoding the signal 718.

After decoding the signal 718, the electronic device makes a determination whether or not it has programming logic installed thereon to recognize the semantic information for the purpose of rendering a native GUI 720.

If the electronic device can recognize the semantic information, the method 700 involves interpreting the semantic information using pre-programmed logic with pre-programmed, form-factor specific logic 722, and rendering a GUI on the portable electronic device 724 that displays the content description according to the interpreted semantic information.

Next, the method 700 involves determining whether the GUI will operate in active mode or passive mode 726, as explained above. If the electronic device is in active mode, inputs are received by the portable electronic device 728 are used to control the GUI on the electronic device 738 as well as encoded as control signals 730. The control signals are transmitted to the media device 732, decoded by the media device 734, and are used to perform an action that affects the GUI on the display connected to the media device 736.

Alternatively, if the electronic device is operating in passive mode, inputs are received by the electronic device 740 and the electronic device controls the rendered GUI using the inputs 752; however, the inputs are not necessarily pushed to the media device. Instead, upon a user of the paired device pushing an input 742, the input is encoded as a control signal 744, transmitted to the media device 746, decoded by the media device 748, and used to perform an action that affects the GUI on the media device 750.

If the electronic device cannot recognize the semantic information, the method 700 involves making a determination whether the programming logic required to interpret the semantic information is available from an external source 760.

If the programming logic required to interpret the semantic information is not available from an external source, the electronic device renders a default GUI and determines whether the GUI will operate in active mode or passive mode 762. If the electronic device is in active mode, inputs are received by the portable electronic device 763 are used to control the GUI on the electronic device 768 as well as encoded as control signals 764. The control signals are transmitted to the media device 765, decoded by the media device 766, and are used to perform an action that affects the GUI on the display connected to the media device 767.

Alternatively, if the electronic device is operating in passive mode, inputs are received by the electronic device 769 and the electronic device controls the rendered GUI using the inputs 775; however, the inputs are not necessarily pushed to the media device. Instead, upon a user of the paired device pushing an input 770, the input is encoded as a control signal 771, transmitted to the media device 772, decoded by the media device 773, and used to perform an action that affects the GUI on the media device 774.

If the electronic device cannot recognize the semantic information but determines that the programming logic required to interpret the semantic information is available from an external source, the method 700 involves downloading the semantic interpretation logic 780, rendering a native GUI using the downloaded semantic interpretation logic 781, and determining whether the GUI will operate in active mode or passive mode 782.

If the electronic device is in active mode, inputs are received by the portable electronic device 783, are used to control the GUI on the electronic device 788, and encoded as control signals 784. The control signals are transmitted to the media device 785, decoded by the media device 786, and are used to perform an action that affects the GUI on the display connected to the media device 787.

Alternatively, if the electronic device is operating in passive mode, inputs are accepted by the electronic device 790 and the electronic device controls the rendered GUI using the inputs 796; however, the inputs are not necessarily pushed to the media device. Instead, upon a user of the paired device pushing an input 791, the input is encoded as a control signal 792, transmitted to the media device 793, decoded by the media device 794, and used to perform an action that affects the GUI on the media device 795.

This exemplary method 700 involves an electronic device sending control signals to a media device which relate to the encoded content information sent to the electronic device by the media device. Some other embodiments involve the electronic device sending control signals to the media device which relate to other content not from the media device. For example, the electronic device can locally store media content and push that media content to the media device.

Referring again to FIG. 6, the system 600 also involves the media device 610 being operatively coupled with the online storage platform 640 via a network 666. In some embodiments, an electronic device 620 with credentials for accessing the online storage platform 640 can push content associated with those credentials to the media device 610.

Figure 8:
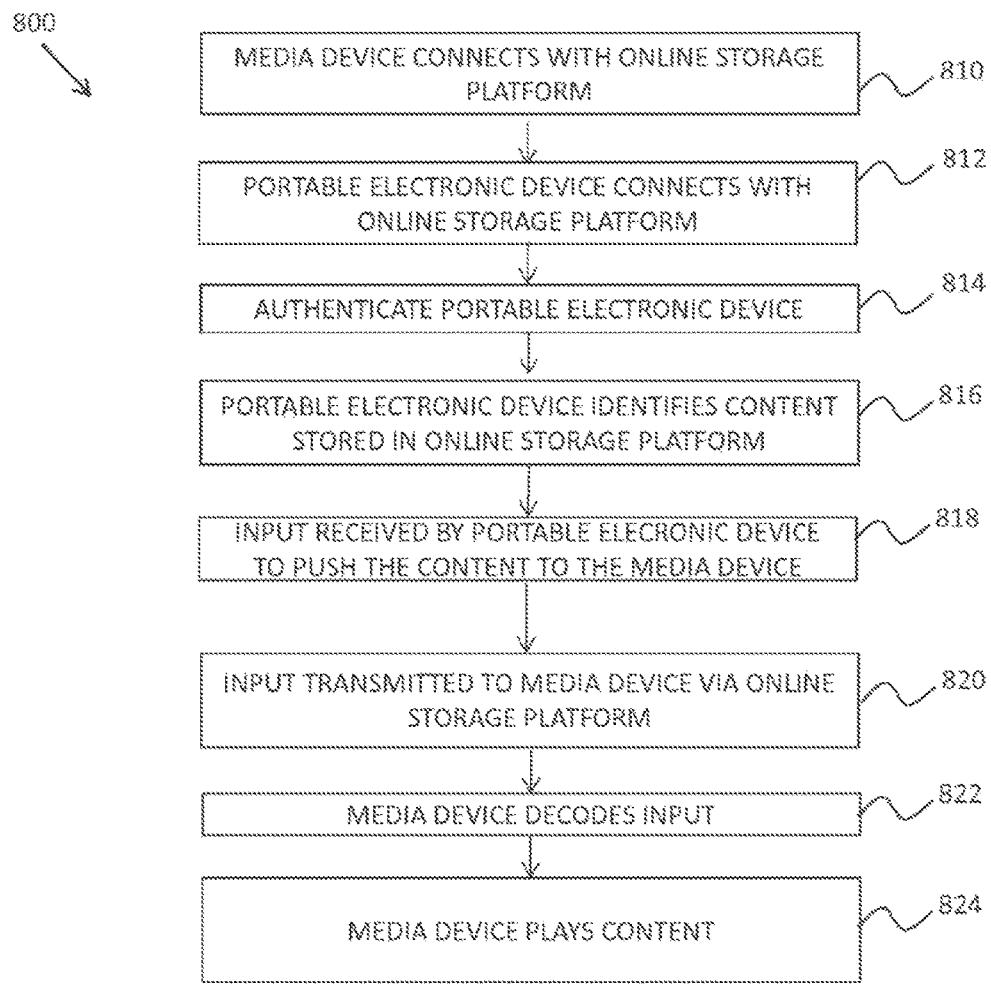
FIG. 8 illustrates a method of pushing content to a media device from an online storage platform according to some embodiments of the present technology.

FIG. 8 illustrates a method 800 of pushing content to a media device from an online storage platform according to some embodiments of the present technology. The method 800 begins with a media device connecting with an online storage platform 810 and a portable electronic device connecting with the online storage platform 812. The portable electronic device is authenticated 814 using credentials for connecting to the online storage platform.

According to some embodiments, the user of the portable electronic device identifies content stored in the online storage platform 816 that the user has a right to consume, but that is not generally available on the media device. Next, the user inputs an instruction to push the content from the online storage platform to the media device 818 and the content is transmitted via the online storage platform 820. Once received, the media device decodes the input 822 (if necessary) and plays the content 824.

In some embodiments, the media device can require that the portable device to obtain credentials before allowing the portable electronic device to pair with the media device. For example, in some embodiments, the portable electronic device can obtain, from a cloud-based storage platform, a cryptographical proof that it is allowed to play certain content and send the proof to the media device. The media device can then send that proof up to the storage platform and receive the rights and cryptographical keys to play that content In addition to pushing content to the media device, some embodiments of the present technology also involve automatically sending a "pause" instruction to the media device to pause the currently played content in the case of one or more event occurring on the electronic device. For example, in the case of a smartphone being used to browse and control video content, the smartphone can automatically instruct the media device to pause the video playback in the event of an incoming cellular call.

Figure 9:
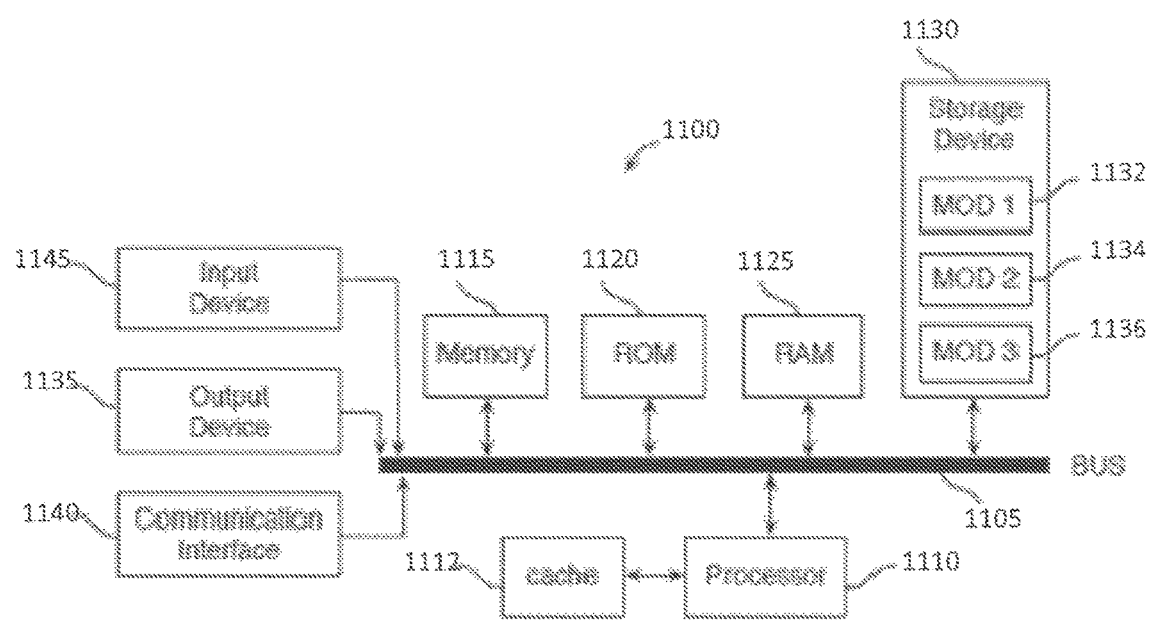
FIG. 9 illustrates a conventional system bus computing system architecture wherein the components of the system are in electrical communication with each other using a bus.
Figure 10:
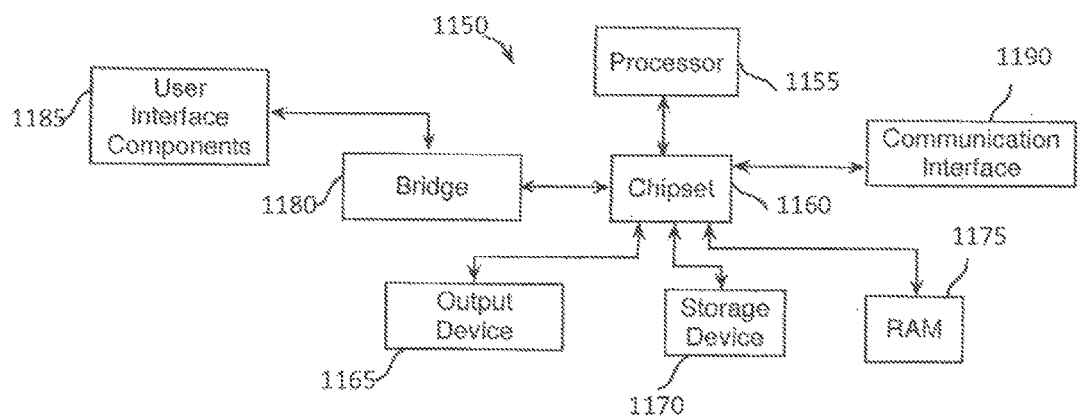
FIG. 10 illustrates a computer system having a chipset architecture that can be used in executing the described method and generating and displaying a graphical user interface (GUI).

FIG. 9 and FIG. 10 illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 9 illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 10 illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 860 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 800 and 850 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method for controlling a media device comprising:
receiving, by a portable electronic device, a signal transmitted from a media device, the signal encoded with information describing media content within a first graphical user interface (GUI) displayed by the media device at a display having a first form factor, the first GUI rendered according to the first form factor;
receiving, by the portable electronic device, semantic information describing a context of the media content comprising a hierarchal collection of media content pages, each media content page comprising a page type, and further describing how to display the media content within the first GUI on the display of the media device in accordance with a form factor thereof;
interpreting the semantic information describing how to display the media content within the first GUI on the display of the media device in accordance with the form factor thereof;
rendering, based at least in part on the interpretation describing how to display the media content within the first GUI on the display of the media device, the media content within a second GUI on the portable electronic device in accordance with a second form factor specific to the portable electronic device, wherein the first form factor and the second form factor are different;
receiving, by the portable electronic device, an input to interact with the second GUI of the portable electronic device, wherein the portable electronic device operates alternately in one of a passive mode and an active mode, wherein when in the passive mode the input is not transmitted to the media device responsive to the input, and when in the active mode the input is transmitted to the media device responsive to the input;
generating, at the portable electronic device, a control command according to the input via the second GUI in the active mode, wherein the control command specifies an action to affect the media content displayed at the display; and
transmitting a control signal corresponding to the control command to the media device, by the portable electronic device, the control signal configured to instruct the media device to perform the action specified.

2. The method of claim 1, further comprising:
receiving an additional signal from the media device, the additional signal encoded with additional information describing the media content displayed by the media device at the display as a result of the action, and additional semantic information describing an additional context of the media content as a result of the action; and
rendering the second GUI on the portable electronic device comprising the additional information describing the media content as a result of the action based on the additional semantic information and the form factor specific to the portable electronic device rendering the second GUI.

3. The method of claim 2, further comprising:
prior to rendering the second GUI comprising the additional information, saving, in a storage location of the portable electronic device, a page of the second GUI;
receiving an input to navigate back to the saved page;
accessing the saved page from the storage location; and
displaying the saved page.

4. The method of claim 1,
wherein the media content is displayed on the second GUI as a page based on the page type, wherein the signal received from the media device is encoded with information describing the hierarchal collection of media content pages, wherein a navigational tree describing how actions in one page lead to the display of an additional page, and
wherein the input received via the second GUI during the passive mode of the portable electronic device specifies an action to display an additional media content page, the method further comprising:
using the navigational tree to determine an additional page type to be displayed in response to the action; and
rendering an additional GUI on the portable electronic device comprising the additional media content page.

5. The method of claim 4, further comprising:
transmitting, in response to a push command, a control signal to the media device for performing the action on the media device.

6. The method of claim 1, wherein the semantic information is interpreted by the portable electronic device by accessing programming logic stored locally on the portable electronic device.

7. The method of claim 1, wherein the semantic information is interpreted by the portable electronic device by automatically accessing programming logic from an online storage platform.

8. The method of claim 1, wherein the semantic information is interpreted by the portable electronic device by accessing programming logic from an external webpage.

9. The method of claim 1, further comprising:
discovering supplemental information from an external webpage, the supplemental information further describing the media content encoded by the signal; and
transmitting the supplemental information to the media device.

10. The method of claim 1, further comprising:
determining that the portable electronic device cannot interpret second semantic information; and
rendering, responsive to such determination, a default GUI on the portable electronic device configured for sending control instructions to the media device.

11. The method of claim 1, further comprising:
authenticating the portable electronic device responsive to detection of the portable electronic device using a proximity sensor of the media device.

12. A system for browsing remote content, the system comprising:
a display device;
a storage device configured to store programming instructions to interpret semantic information received from a remote media device;
a network interface configured to receive a signal transmitted from a media device, encoded with information describing media content within a first graphical user interface (GUI) displayed by the media device at a first display with a form factor different than the display device, and semantic information describing a context of the media content comprising a hierarchal collection of media content pages, each media content page comprising a page type, and further describing how to display the media content within the first GUI on the display of the media device in accordance with the form factor thereof; and
one or more processors configured to:
interpret the semantic information describing how to display the media content within the first GUI on the display of the media device in accordance with the form factor thereof; and
render, based at least in part on the interpretation describing how to display the media content within the first GUI on the display of the media device, the media content within a second GUI on the display device with a second form factor specific to the display device.

13. The system of claim 12, wherein the one or more processors are further configured to determine that the storage device does not contain a set of programming instructions to interpret semantic information received from the remote media device.

14. The system of claim 13, wherein the one or more processors are further configured to, responsive to determining that the storage device does not contain a set of programming instructions to interpret the received semantic information, request programming instructions from an external source via the network interface.

15. The system of claim 12, wherein the one or more processors are further configured to encode a control instruction, specified by a control command, that is based on an input received via the second GUI, and wherein the network interface is further configured to send the control instruction to the media device.

16. The system of claim 15, wherein the one or more processors are further configured to render the second GUI with an interface element actuable to push the control command to the media device, and wherein the network interface is further configured to send the control command to the media device when the interface element is actuated.

17. The system of claim 12,
wherein the network interface is further configured to:
discover supplemental information from an external webpage, the supplemental information further describing the media content encoded by the signal; and
transmit the supplemental information to the media device.

18. The system of claim 12, wherein the one or more processors are further configured to:
determine that second semantic information cannot be interpreted; and
render a default third GUI on the display device configured for sending control instructions to the media device.

19. At least one non-transitory computer-readable storage medium storing instructions that, when executed by one or more processing devices of a system, cause the system to:
receive a signal transmitted from a media device, the signal encoded with information describing media content displayed by the media device at a display having a first form factor, and semantic information describing a context of the media content comprising a hierarchal collection of media content pages, each media content page comprising a page type, and further describing how to display the media content on the display of the media device in accordance with the first form factor;
interpret the semantic information describing how to display the media content on the display of the media device in accordance with the first form factor;
render, based at least in part on the interpretation describing how to display the media content on the display of the media device, the media content within a graphical user interface (GUI) on a display device in accordance with a second form factor specific to the display device, wherein the first form factor and the second form factor are different; and receive an input to interact with the GUI, wherein the display device operates alternately in one of a passive mode and an active mode, wherein when in the passive mode the input is not transmitted to the media device and when in the active mode the input is transmitted to the media device.

20. The at least one non-transitory computer-readable storage medium of claim 19, wherein the instructions further cause the system to:

generate a control command responsive to the input received via the GUI when the display device is in the active mode, wherein the control command specifies an action to affect the media content displayed at the display of the media device;

transmit a control signal corresponding to the control command to the media device;

receive an additional signal from the media device, the additional signal encoded with additional information describing the media content displayed by the media device at the display of the media device, and additional semantic information describing an additional context of the media content as a result of the action; and render a second GUI on the display device based, at least in part, on the additional semantic information.

21. The at least one non-transitory computer-readable storage medium of claim 20, wherein the instructions further cause the system to:

prior to rendering the second GUI, save, in a storage location of the display device, a page of the second GUI;

receive an input to navigate back to the saved page;

access the saved page from the storage location; and display the saved page.

22. The at least one non-transitory computer-readable storage medium of claim 19, wherein the media content is displayed within the GUI of the display device as a page based on the page type, wherein the signal received from the media device is encoded with information describing a hierarchal collection of media content pages, wherein a navigational tree describing how actions in one page lead to the display of an additional page, wherein the input received via the GUI in the passive mode of the display device specifies an action that is configured to result in an additional media content page, and wherein the instructions further cause the system to:

use the navigational tree to determine an additional page type to be displayed in response to the action; and render an additional GUI for displaying the additional media content page.

23. The at least one non-transitory computer-readable storage medium of claim 22, wherein the instructions further cause the system to:

automatically transmit a control signal corresponding to a control command to the media device for performing the action on the media device; and transmit, in response to a push command, the control signal to the media device for performing the action on the media device.

24. The at least one non-transitory computer-readable storage medium of claim 19, wherein the semantic information is interpreted by accessing programming logic stored locally on the display device.

25. The at least one non-transitory computer-readable storage medium of claim 19, wherein the semantic information is interpreted by accessing programming logic from an online storage platform.

26. The at least one non-transitory computer-readable storage medium of claim 19, wherein the semantic information is interpreted by accessing programming logic from an external webpage.

27. A method for providing control over a media device to a portable electronic device comprising:

encoding semantic information into a signal describing media content displayed by the media device at a display in accordance with a form factor of the display, the semantic information describing a first graphical user interface (GUI) comprising a hierarchal collection of media content pages, each media content page comprising a page type, the semantic information further describing how to display the media content within the first GUI on the display of the media device in accordance with the form factor thereof;

transmitting, from the media device, the signal to the portable electronic device;

receiving a control instruction from the portable electronic device, the control instruction representing an input received through a native interface rendered on the portable electronic device based, at least in part, on the semantic information sent by the media device describing how to display the media content within the first GUI on the display of the media device in accordance with the form factor thereof, wherein the form factor of the media device and a second form factor of the portable electronic device are different; and controlling the first GUI on the media device according to the control instruction.

28. The method of claim 1, wherein the page type for each media content page comprises a type of page being displayed at the display of the media device, the type of page comprising at least one of a content list, search result, or media information.

* * * * *